US006418242B1

(12) United States Patent
Maurer

(10) Patent No.: US 6,418,242 B1
(45) Date of Patent: Jul. 9, 2002

(54) EFFICIENT DETECTION OF ERROR BLOCKS IN A DCT-BASED COMPRESSED VIDEO SEQUENCE

(75) Inventor: Steven D. Maurer, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/195,730

(22) Filed: Nov. 18, 1998

(51) Int. Cl.⁷ .............................................. H04N 7/26
(52) U.S. Cl. ...................................... 382/266; 358/1.9
(58) Field of Search ................... 358/1.9; 382/266–269, 382/242, 248–250

(56) References Cited

U.S. PATENT DOCUMENTS

| | | | |
|---|---|---|---|
| 4,897,717 A | * 1/1990 | Hamilton et al. | ........... 358/133 |
| 5,557,330 A | * 9/1996 | Astle | ........................... 348/394 |
| 5,802,213 A | * 9/1998 | Gardos | ....................... 382/239 |
| 5,812,219 A | * 9/1998 | Heusdens | ................... 348/699 |

OTHER PUBLICATIONS

M.R. Pickering, et al, "A Statistical Error Technique for Low Bit–Rate Video", 1997, pp. 773–776, vol. Conf 12, IEEE, US.

Chung J. Kuo, et al, "Adaptive Postprocessor of Block Encloded Images", IEEE Transactions on Circuits and Systems for Video Technology, Aug. 5, 1995, pp. 298–304, vol. 4, IEEE, New York, US.

Junseong Park, et al, "Recovery of Block–coded Images from Channel Errors", Proceedings of the International Conference on Communications, May 23–26, 1993, pp. 396–400, vol. 1/3, IEEE, New York, US.

M.R. Pickering, et al, A Error Concealment Technique in the Spatial Frequency Domain:, Signal Processing, European Journal Devoted to the Methods and Applications of Signal Processing, Oct. 1, 1996, pp. 185–189, vol. 54, No. 2, Elsevier Science, B.V. Ansterdam.

\* cited by examiner

Primary Examiner—Thomas D. Lee
Assistant Examiner—Stephen Brinich
(74) Attorney, Agent, or Firm—Francis I. Gray

(57) ABSTRACT

A method of efficient and reliable detection of error blocks in a DCT-based compressed video sequence extracts edges from an image that correspond to the DCT blocks. These edges are processed to determine an edge energy value. The edge energy value is compared with a threshold to provide an alarm for an error block when the threshold is exceeded. The edge energies for each block may be summed and compared with an overall threshold value to generate the alarm, or the edge energy for each edge may be compared with an edge threshold value to determine which are good and which are suspect, with the alarm being set when at least three of the edges are suspect (two edges for corner blocks).

11 Claims, 2 Drawing Sheets

EFFICIENT DETECTION OF ERROR BLOCKS IN A DCT-BASED COMPRESSED VIDEO SEQUENCE

BACKGROUND OF THE INVENTION

The present invention relates to video compression, and more particularly to a method of efficient and reliable detection of error blocks in a DCT-based compressed video sequence.

One noticeable defect in video sequences that have been subjected to a DCT-based codec, such as MPEG-2 video compression, is the incorrect displaying of DCT blocks of data that actually belong to a different field, usually due to coding or buffer overrun errors.

Co-pending U.S. patent application Ser. No. 09/152,495 entitled "Picture Quality Measurement Using Blockiness", filed Sep. 10, 1998 by Bozidar Janko and Steven Maurer, describes a method of detecting the amount of blockiness in an image. Vertical and/or horizontal edges are detected and cross-correlated with a grid having a kernel equal in size to the DCT block sizes used in the particular compression scheme used. The average magnitude of the accumulation buckets used for the cross-correlation is compared with the maximum accumulation value from one. of the buckets to determine the amount of blockiness. If incorrect codec coding or buffer overruns cause error blocks throughout the image, a general blockiness measurement is sufficient to detect their presence. However, a general blockiness measurement doesn't reliably detect small numbers of error blocks because their blockiness signature is often masked by the noise in the overall picture content. A single error block in an image, otherwise devoid of blockiness, is often not enough to cause the overall blockiness measure to exceed acceptable tolerances, even though the defect is easily and often annoyingly obvious to the human eye.

What is desired is a method of efficient and reliable detection of error blocks in a DCT-based compressed video sequence that more reliably detects small numbers of error blocks in images in the video sequence which would not otherwise be detected via an overall blockiness measure.

BRIEF SUMMARY OF THE INVENTION

Accordingly the present invention provides a method of efficient detection of error blocks in a DCT-based compressed video sequence by extracting edges with a periodicity equal to the DCT block kernel of the compression scheme being used, as detected by an overall blockiness measure. The extracted edge energies corresponding to the DCT block edges may be summed and compared with an overall threshold to determine if a particular block is an error block. Alternatively each edge energy may be tested against an individual edge energy threshold, and those blocks which have a specified number of edges, typically three, that exceed the threshold are determined to be error blocks. Either method may further be refined by subtracting from the edge energy the moving average of localized energy around the edge being measured to reduce false positives from spatially noisy areas.

The objects, advantages and other novel features of the present invention are apparent from the following detailed description when read in conjunction with the appended claims and attached drawing.

DETAILED DESCRIPTION OF THE INVENTION

Figure 1:
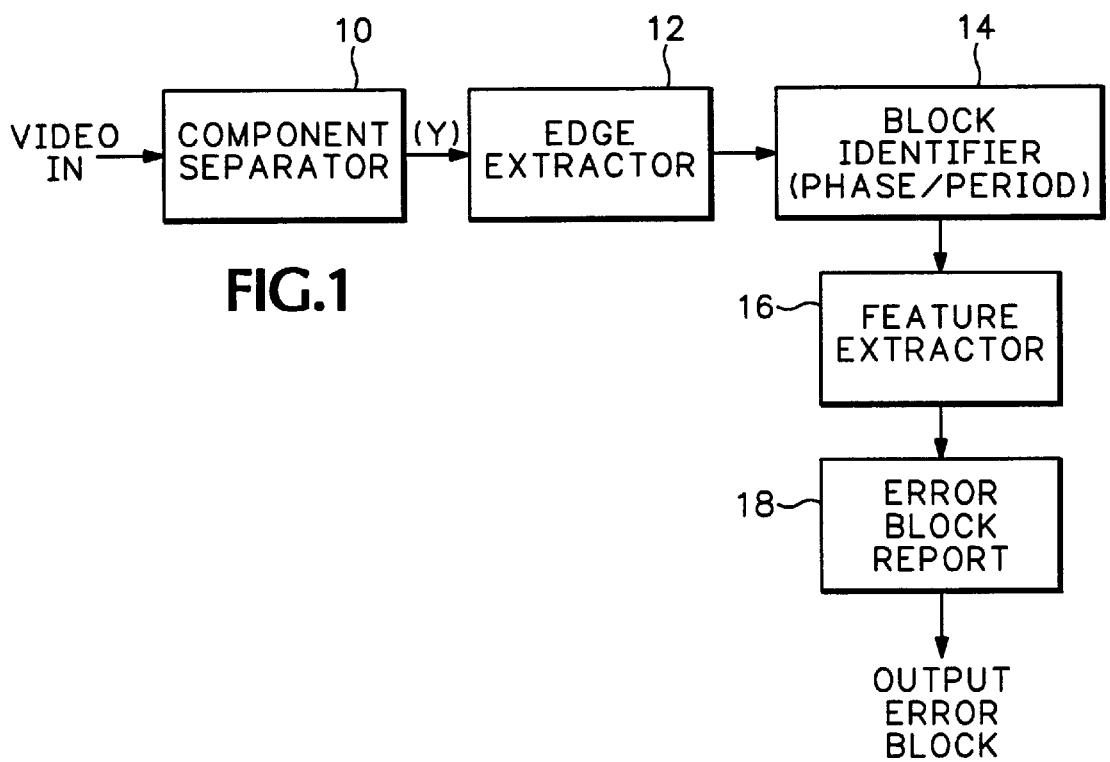
FIG. 1 is a functional block diagram view of a method of efficient detection of error blocks according to the present invention.

Referring now to FIG. 1 a video input signal that has been compressed and decompressed at least once is input to a Component Separator 10. Generally the luminance component (Y) is extracted in the Component Separator 10 but, either to specifically detect error blocks in the color portion of decoding or for more computationally light-weight processing when it is known that the codec manifests identical errors in luminance and chrominance channels, one of the chrominance components (C) may be measured instead. The video component from the Component Separator 10 is input to an Edge Extractor 12, which generally is in the form of an edge-enhancing filter such as a Sobel filter or a boxcar filter as specified in the above-mentioned co-pending U.S. Patent Application. Horizontal edge transitions are extracted, and vertical edge transitions may also be extracted when necessary. The extracted edge transitions are converted to positive differences, i.e., the transitions are subject to absolute values. The positive differences are than input to a Block Identifier 14.

The Block Identifier 14 processes the positive differences to find a spatial period (size) and spatial phase (location) corresponding to the DCT blocks. The processing of the input video sequence to this point is essentially identical to the algorithm described in the above-mentioned U.S. Patent Application. When the periodicity of the DCT blocks is unknown, this may be determined through the use of the overall blockiness measure as specified in said Application. This is accomplished by repeatedly measuring video images at different spatial periods, obtaining the overall blockiness measure for each one. Any period that consistently and repeatedly reports the highest value across numerous images in the video sequence is the period of the DCT blocks. This method works even if the DCT block impairments are much too faint to be detected by the human eye.

All differential energies, and the spatial phase and period of the DCT blocks, are input to a Feature Extractor 16, regardless of whether the overall blockiness measure is high enough to cause an alarm. The Feature Extractor 16 processes the edges on the identified DCT block boundaries and, in one embodiment, sums them. If the sum exceeds a user definable combined block threshold value, the block is reported to an Error Block Reporter 18. The Feature Extractor 16 may also test each edge to see if it exceeds a user definable edge threshold value and, if more than a specific number of them do, report the block to the Error Block Reporter 18. The number of edges necessary to cause an alarm is typically three, but may be set to four to cause the Error Block Reporter 18 to be less sensitive or may be set to two for blocks on the corners of the image which only have two edges.

The algorithm described above may be further modified to subtract from each edge the average differences surrounding the edge. By doing this, only the edge energy that is disproportionate to the local region remains, hence lowering the chance of false detection of error blocks in regions with high differential content, such as video snow, fields of grass, etc. The average differences are obtained by summing the differences in a line centering on and perpendicular to the edge being tested. Typically the number of differences that are averaged is equal to the detected spatial size of the blocks, but this may be reduced for the sake of computational efficiency.

Figure 2:
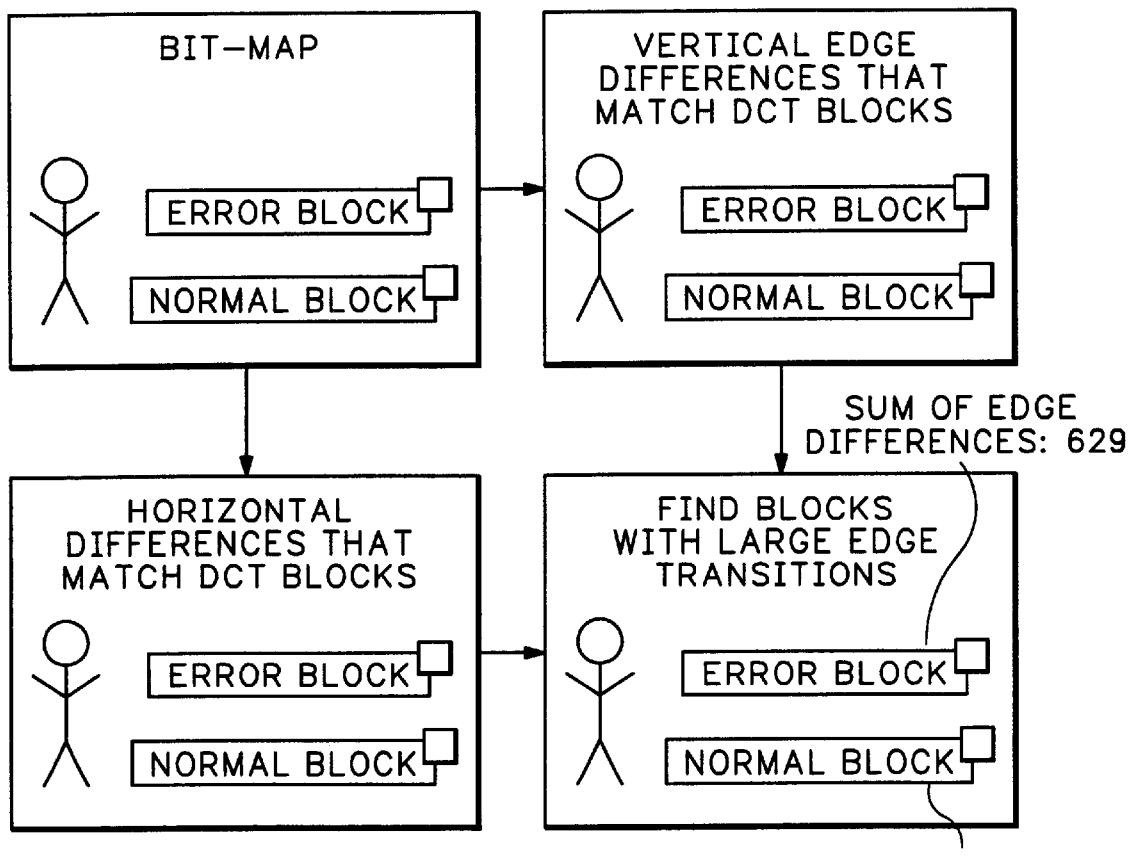
FIG. 2 is an illustrative view of the method of efficient detection of error blocks according to the present invention.

As shown in FIG. 2 an image is shown in a bit-map video representation that has a normal block and an error block. The image is processed to determine the edge differences that match DCT blocks, horizontally and/or vertically. The blocks with large edge transitions are error blocks, while the blocks with small edge transitions are normal blocks. As shown, the error block in this particular illustration has a sum of the edge differences equal to 629, which is substantially larger than the sum of the edge differences for a normal block, equal to only 83.

Figure 3:
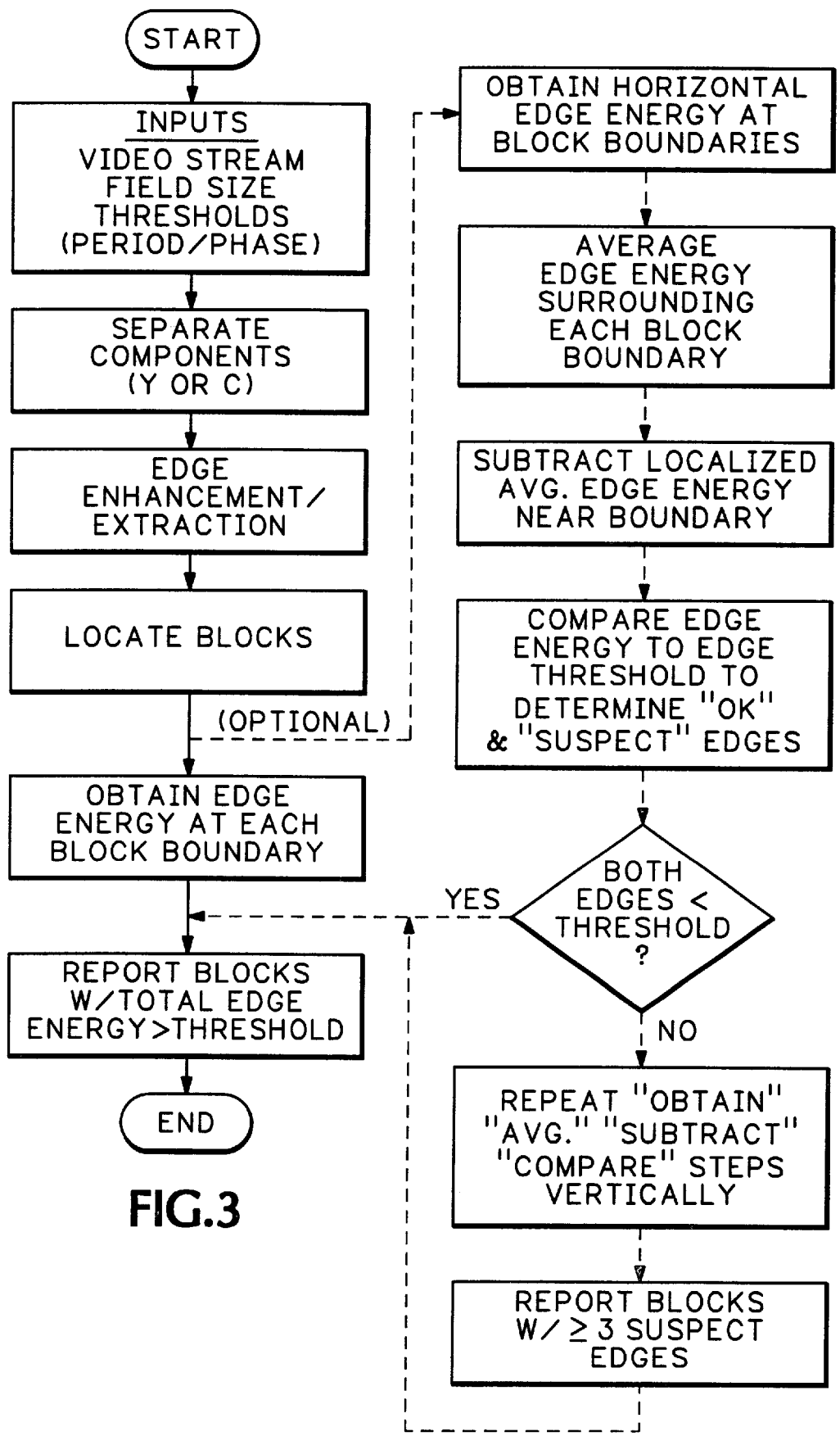
FIG. 3 is a flow diagram view of the method of efficient detection of error blocks according to the present invention.

Referring now to FIG. 3 the inputs to the error block detecting algorithm are the video stream, the field size of the images in the video stream, edge thresholds (sum and/or individual), and the period/phase of the DCT blocks according to the compression scheme used (if known). The video stream is separated into its components, one or more of which may be processed to detect error blocks. Each component is processed by an edge enhancement filter to determine edges. Based upon the edges determined and the DCT block kernel, the corresponding blocks are located in the images of the video component.

If the period (size or kernel) of the DCT blocks is not known, the above steps may be repeated for different DCT block sizes to determine what the period of the DCT blocks in the images are. With the period and phase information, together with the edge information, the blocks in the images corresponding to the DCT blocks are located. At each edge boundary the edge energy is obtained and stored in a block edge array. For each block the total edge energy is computed and compared to an overall threshold value, as in FIG. 2. Those blocks that have a total edge energy greater than the threshold are reported as error blocks.

An optional or supplemental methodology is, after locating the blocks in the images, to obtain the horizontal edge energies at block boundaries. The energy surrounding each boundary is averaged along a line through the center of the particular edge, and subtracted from the edge energy at the boundary. For each edge the energy is compared with an edge threshold value to determine whether the edge is "OK" (normal) or "suspect" (possible error block). If both edges are "OK", then this methodology returns to report the total edge energy when it exceeds the overall threshold, as in the first methodology. If one or both of the edges is "suspect", then the steps are repeated vertically to determine if the orthogonal edges are "OK" or "suspect". If at least three of the edges of any block are determined to be "suspect", then that block is reported as an error block.

Thus the present invention provides a method of efficient and reliable detection of error blocks in DCT-based compressed video by obtaining edge energies for blocks in the image that correspond to DCT blocks, and evaluating the edge energies to determine whether they exceed a given threshold that indicates an error block.

What is claimed is:

1. A method for detecting error blocks in a DCT-based compressed video sequence comprising the steps of:
   locating blocks in images of the video sequence corresponding to DCT blocks having a given block size;
   obtaining edge energies for each block of each image; and
   reporting as an error block each block where edge energies for the block meet a given criteria.

2. The method as recited in claim 1 further comprising the step of determining from the images in the video sequence the given block size.

3. The method as recited in claim 2 wherein the determining step comprises the steps of:
   enhancing edges that occur in the images of the video sequence;
   correlating the edges in the images with a plurality of DCT block sizes; and
   selecting as the given block size the DCT block size having the best correlation from the correlating step.

4. The method as recited in claim 1 wherein the locating step comprises the steps of:
   enhancing edges that occur in the images of the video sequence; and
   correlating the edges with the DCT blocks to determine the location of the blocks in the images.

5. The method as recited in claim 1 further comprising the steps of:
   separating the video sequence into a luminance component video sequence and chrominance component video sequences; and
   selecting the images from one of the component video sequences for input to the locating step.

6. The method as recited in claim 1 wherein the obtaining step comprises the steps of:
   computing differences across block boundaries in a first dimension as edge energies; and
   computing differences across block boundaries in a second dimension orthogonal to the first dimension as edge energies.

7. The method as recited in claim 6 wherein the obtaining step further comprises the steps of:
   averaging differences surrounding each of the block boundaries in each dimension; and
   subtracting the averaged differences from the corresponding edge energies to obtained noise reduced edge energies for input to the reporting step as the edge energies.

8. The method as recited in claim 6 or 7 wherein the reporting step comprises the steps of:
   for each block summing the edge energies for all edges of the block to produce a total edge energy; and
   indicating the block as an error block when the total edge energy exceeds a given overall threshold value as the given criteria.

9. The method as recited in claim 1 wherein the obtaining step comprises the steps of:
   computing the differences across block boundaries in a first dimension as edge energies;
   comparing the edge energy at each block boundary in the first dimension with an edge threshold value to determine whether the block boundary is a suspect edge; and
   repeating the computing, comparing and determining steps across block boundaries in a second dimension orthogonal to the first dimension when the results of the comparing step for either of the block boundaries produces the suspect edge.

10. The method as recited in claim 9 wherein the reporting step comprises the steps of:
    totaling the number of suspect edges for each block to produce a total suspect edge number; and
    indicating that the block is an error block when the total suspect edge number is greater than or equal to a specified number as the given criteria.

11. The method as recited in claim 10 wherein the reporting step further comprises the step of, for blocks that have only two boundaries in common with other blocks, indicating that the block is an error block when both boundaries are suspect edges.

* * * * *